(12) United States Patent
Cheng et al.

(10) Patent No.: US 11,366,276 B2
(45) Date of Patent: Jun. 21, 2022

(54) LOW SHRINK AND SMALL BEND PERFORMING DROP CABLE

(71) Applicant: CORNING RESEARCH & DEVELOPMENT CORPORATION, Corning, NY (US)

(72) Inventors: Xiaole Cheng, Painted Post, NY (US); Michael John Gimblet, Conover, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/186,430

(22) Filed: Feb. 26, 2021

(65) Prior Publication Data

US 2021/0181441 A1 Jun. 17, 2021

Related U.S. Application Data

(60) Continuation of application No. 16/859,043, filed on Apr. 27, 2020, now abandoned, which is a division of
(Continued)

(51) Int. Cl.
*G02B 6/44* (2006.01)

(52) U.S. Cl.
CPC ........... *G02B 6/443* (2013.01); *G02B 6/4432* (2013.01); *G02B 6/4436* (2013.01);
(Continued)

(58) Field of Classification Search
CPC .... G02B 6/4402; G02B 6/443; G02B 6/4432; G02B 6/4436; G02B 6/4486; G02B 6/4495
See application file for complete search history.

(56) References Cited

U.S. PATENT DOCUMENTS 5,761,362 A * 6/1998 Yang .................... G02B 6/4494
385/113
6,487,345 B1 11/2002 Dixon et al.
(Continued)

FOREIGN PATENT DOCUMENTS

AU 2008248141 A1 11/2008
EP 1326113 A2 7/2003
(Continued)

OTHER PUBLICATIONS

European Patent Application No. 18879937.3, Extended European Search Report dated Jul. 6, 2021; 10 pages; European Patent Office.
(Continued)

*Primary Examiner* — Ryan A Lepisto
(74) *Attorney, Agent, or Firm* — William D. Doyle

(57) ABSTRACT

Embodiments of an optical fiber cable are provided. The optical fiber cable includes at least one optical fiber, a buffer tube surrounding the at least one optical fiber, and at least one tensile element wound around the buffer tube. The at least one tensile element has a laylength of at least 200 mm. The optical fiber cable also includes an exterior jacket surrounding the tensile element. The exterior jacket is made up of at least one polyolefin, at least one thermoplastic elastomer, and at least one high aspect ratio inorganic filler. Further, the exterior jacket has an averaged coefficient of thermal expansion of no more than $120(10^{-6})$ m/mK.

6 Claims, 2 Drawing Sheets

Related U.S. Application Data application No. 16/177,955, filed on Nov. 1, 2018, now Pat. No. 10,663,682.

(60) Provisional application No. 62/588,616, filed on Nov. 20, 2017.

(52) U.S. Cl.
CPC .......... *G02B 6/4486* (2013.01); *G02B 6/4402* (2013.01); *G02B 6/4495* (2013.01)

(56) References Cited

U.S. PATENT DOCUMENTS

| | | | |
|---|---|---|---|
| 6,801,695 B2 | 10/2004 | Lanier et al. | |
| 6,925,235 B2 | 8/2005 | Lanier et al. | |
| 7,660,505 B2 | 2/2010 | Chase et al. | |
| 8,705,921 B2* | 4/2014 | Blazer | G02B 6/4432 385/102 |
| 8,916,776 B2* | 12/2014 | Cinquemani | H01B 9/025 174/120 SC |
| 9,140,868 B2* | 9/2015 | Martin Regalado | G02B 6/4427 |
| 9,207,419 B2* | 12/2015 | Martin Regalado | G02B 6/4401 |
| 10,114,190 B2* | 10/2018 | Carberry | B41J 2/01 |
| 10,131,774 B2* | 11/2018 | Bringuier | G02B 6/443 |
| 10,663,682 B2 | 5/2020 | Cheng et al. | |
| 2003/0035635 A1 | 2/2003 | Chastain et al. | |
| 2003/0128941 A1 | 7/2003 | Lanier et al. | |
| 2004/0240808 A1* | 12/2004 | Rhoney | G02B 6/4433 385/100 |
| 2004/0258372 A1* | 12/2004 | Risch | G02B 6/443 385/100 |
| 2005/0041941 A1 | 2/2005 | Lanier et al. | |
| 2008/0279514 A1 | 11/2008 | Kundis et al. | |
| 2010/0254668 A1* | 10/2010 | Consonni | G02B 6/4429 385/102 |
| 2011/0142403 A1* | 6/2011 | Hurley | G02B 6/4411 385/100 |
| 2016/0377825 A1* | 12/2016 | Bringuier | G02B 6/4434 385/113 |
| 2017/0235069 A1 | 8/2017 | Risch et al. | |

FOREIGN PATENT DOCUMENTS

| | | |
|---|---|---|
| EP | 1489447 A1 | 12/2004 |
| WO | 2015/142604 A1 | 9/2015 |

OTHER PUBLICATIONS

International Search Report and Written Opinion of the International Searching Authority; PCT/US2018/060761; dated Jan. 24, 2019, 9 pages; European Patent Office.

* cited by examiner

LOW SHRINK AND SMALL BEND PERFORMING DROP CABLE

PRIORITY APPLICATION

This application is a continuation of U.S. patent application Ser. No. 16/859,043 filed on Apr. 27, 2020, which is a divisional of U.S. patent application Ser. No. 16/177,955, now U.S. Pat. No. 10,663,682, filed on Nov. 1, 2018, which claims the benefit of U.S. Provisional Application No. 62/588,616, filed on Nov. 20, 2017, the content of which is relied upon and incorporated herein by reference in its entirety.

BACKGROUND

The disclosure relates generally to optical fiber cables and more particularly to an exterior jacket composition and a tensile element that allow for increased processing speeds. Cables, such as power transmission cables, telephone cables, optical fiber cable, etc., are used to transmit electricity and/or data over distance. In order to do so, the cables have to be strung across land and/or buried in the ground between electricity/data sources and delivery points. Because of their exposure to hot and cold temperatures, the cable jacket expands and contracts, which causes cable buckling. Cable buckling attenuates the signal traveling along the cable and can lead to premature deterioration of the cable.

SUMMARY

In one aspect, embodiments of an optical fiber cable are provided. The optical fiber cable includes at least one optical fiber, a buffer tube surrounding the at least one optical fiber, and at least one tensile element wound around the buffer tube. The at least one tensile element has a laylength of at least 200 mm. The optical fiber cable also includes an exterior jacket surrounding the tensile element. The exterior jacket includes at least one polyolefin, at least one thermoplastic elastomer, and at least one high aspect ratio inorganic filler. Further, the exterior jacket has an averaged coefficient of thermal expansion of no more than $120(10^{-6})$ W/mK.

In another aspect, embodiments of a method of manufacturing a drop cable are provided. In a step, a buffer tube containing at least one optical fiber is moved along a processing line at a rate of at least 200 m/min. In another step, at least one strand of a tensile element is wrapped around the buffer tube in such a manner that the tensile element has a laylength of at least 200 mm. In a further step, the tensile element is coated with an exterior jacket made of a polyolefin component, a thermoplastic elastomer component, and an inorganic filler component.

In still another aspect, embodiments of a cable are provided. The cable includes at least one conductor, at least one tensile element wound around the at least one conductor, and an exterior jacket surrounding the tensile element. In the cable, the at least one tensile element has a laylength of at least 500 mm. Further, the exterior jacket is made up of from 30% to 60% by weight of at least one polyolefin, from 30% to 60% by weight of at least one thermoplastic elastomer, and from 5% to 30% by weight of at least one inorganic filler.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
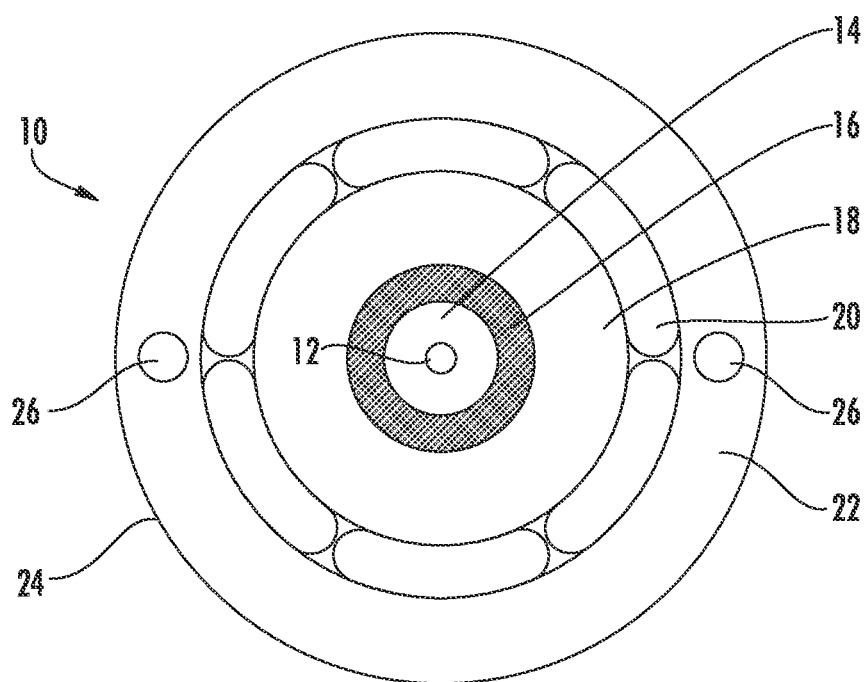
FIG. 1 depicts a cross section of a drop cable, according to an exemplary embodiment.

Referring generally to the figures, various embodiments of an optical fiber cable construction are provided. In particular, the optical fiber cable construction disclosed herein includes an exterior jacket with antibuckling properties and a tensile element that can be applied at high speeds. In previous optical fiber cable constructions, strands of glass fibers were wound around the buffer tube of an optical fiber to reduce the occurrence of cable buckling, but these strands had to be applied at low speed. Further, the strands of glass fibers tended to be stiff, which causes signal attenuation when the optical fiber cable is bent. In the presently disclosed cable construction, the exterior jacket of the optical fiber cable includes one or more thermoplastic elastomers and high aspect ratio fillers, and these components allow for resistance to cable buckling via the exterior jacket instead of using the strands of glass fibers. In this way, a tensile element that is more flexible than the strands of glass fibers is able to be wound around the buffer tube of an optical fiber, which improves bend performance and which is able to be applied to the cable core at much faster line speeds. Thus, the disclosed optical fiber cable construction provides the synergistic effects of improved antibuckling performance, improved bend performance, and improved processing speeds. While the discussion focuses on the use of the exterior jacket and the tensile element in an optical fiber cable, particularly a drop cable, the polymeric jacket and the tensile element can also be utilized in the context of other cables, such as other electrical and telecommunication cables.

Because optical fiber cables are often deployed in outdoor environments, they may be exposed to temperature extremes. For example, optical fiber cables are deployed in environments where temperatures reach as low as −40° C. and/or as high as 70° C. In general, cold temperatures cause the cable jacket to contract and/or become stiff, and warm temperatures cause the cable jacket to expand. In certain conventional cables, the cable jacket is made primarily of polyolefins, such as polyethylene (e.g., high density, medium density, low density, and/or linear low density) or polypropylene, which expand and contract to a greater extent than the optical fiber. The difference in expansion and contraction between the cable jacket and the optical fiber creates stresses along the length of the cable, which can cause the cable to loop or twist. This looping and twisting is known as buckling, and such buckling can cause signal attenuation and/or premature degradation of the cable. Thus, antibuckling elements, such as strands of glass fibers, are typically wound around the buffer tube of the optical fiber to reduce buckling. However, as mentioned above, strands of glass fibers are relatively stiff, which impairs bend performance, and must be applied at relatively low processing speeds, e.g., at cable line speeds of about 20 m/min.

As discussed herein, bend performance is measured by wrapping a cable around a mandrel a specified number of times and then measuring the loss of a transmitted signal. Tests of this variety are defined in ICEA 717 and IEC-60794-1-21, Method E11. In general, the size of the cable determines the size of the mandrel used for testing. The particular test used herein considers a drop cable wrapped around a 60 mm mandrel three times. Signals are passed through the optical fiber at various wavelengths, such as 1625 nm, 1550 nm, and 1310 nm, and the signal attenuation (i.e., loss) resulting from the bending of the cable around the mandrel is measured. Generally, using a mandrel with a smaller diameter for a given cable width will result in higher attenuation or signal loss as a result of the tighter bend in the cable to wrap it around the mandrel. For the purposes of the test considered herein, the signal attenuation is measured with respect to the 1550 nm wavelength. A passing performance for the cable in such a bend performance test is a signal loss of less than 0.05 dB. As will be discussed more fully below, the optical fiber cable construction disclosed herein addresses the issues of bend performance, antibuckling, and processing speeds through use of a more flexible tensile element and a polymeric jacket that includes a thermoplastic elastomer component and a high aspect ratio filler component.

FIG. 1 provides an exemplary embodiment of a drop cable 10. At the center of the drop cable 10 is a conductor, which is an optical fiber 12 in the embodiment depicted. As used herein, a "conductor" is an element that conducts electrical or telecommunication signals. As shown in FIG. 1, the optical fiber 12 is surrounded by a buffer tube 14 such that the buffer tube 14 is essentially a sheath for the optical fiber 12. Wrapped around the buffer tube 14 are one or more tensile elements 16. The tensile elements 16 reinforce the tensile strength of the drop cable 10 when stretched. The tensile elements 16 include strands of yarn, ribbon, and/or banding that are wound (e.g., helically wound) around the buffer tube 14. In a particular embodiment, the tensile elements 16 are one to ten strands of yarn, ribbon, and/or banding. As depicted in FIG. 1, the tensile elements 16 form a continuous layer around the circumference of the buffer tube 14. In a particular embodiment, the continuous layer is created by helically winding nine strands of yarn around the buffer tube 14. In other embodiments, a discontinuous layer is provided around the circumference of the buffer tube 14 by using less than nine yarns.

As mentioned briefly above, the tensile elements 16 are more flexible than the conventionally-used strands of glass fibers. In a particular embodiment, the tensile elements 16 are one or more strong and flexible strands (e.g., of yarn, ribbon, banding, etc.) made from filaments of at least one of an aramid, a carbon fiber, an ultra-high molecular weight polyethylene (UHMWPE), an ethylene chlorotrifluoroethylene (ECTFE), a polybenzimidazole (PBI), a perfluoroalkoxy (PFA), a polytetrafluoroethylene (PTFE), a polyphenylene sulfide (PPS), a liquid crystal polymer (LCP), or a polyphenylene benzobisoxazole (PBO). In embodiments, the strands are made up of loose filaments, and in other embodiments, the filaments are impregnated or coated with a binder, such as an ethylene vinyl acetate, polyamide, or polyester hot melt. In an experimental embodiment discussed in more detail below, the tensile elements 16 were selected to contain loose aramid filaments. In embodiments, the tensile elements 16 have a mass length of from 500 dtex to 2500 dtex (dtex being grams per 10,000 m).

Surrounding the tensile elements 16 is an interior jacket 18. In embodiments, the interior jacket 18 is a polymer or polymer blend containing flame retardant additives. In a more specific embodiment, the flame retardant additives are non-corrosive, i.e., they do not contain halogens. Such polymers may also be referred to as "low smoke, zero halogen" or "LSZH" polymers. In embodiments, the interior jacket 18 is extruded around the tensile elements 16.

A plurality of tensile strands 20 are wrapped (e.g., helically wrapped) around the interior jacket 18. In embodiments, the tensile strands 20 are glass fibers and/or the strong and flexible strands discussed above in the context of the tensile elements 16. In embodiments where glass fibers are used, the tensile strands 20 are may be composed of glass fibers bound together, in part, with resin, such as epoxy, polyester, polyamine imide, etc. As can be seen in the embodiment of FIG. 1, there are six tensile strands 20 surrounding the interior jacket 18 to provide a substantially complete layer of tensile strands 20 around the circumference of the interior jacket 18. However, in other embodiments, more or fewer tensile strands 20 can be used. In particular embodiments, the number of tensile strands 20 is from two to ten. In an embodiment, three tensile strands 20 are used to provide an incomplete layer of tensile strands 20 around the circumference of the interior jacket 18. Outside of the tensile strands 20, an exterior jacket 22 is provided. The exterior jacket 22 has a surface 24 that defines the outermost surface of the drop cable 10. Embedded in the exterior jacket 22 is one or more access elements, such as ripcords 26.

As discussed above, the synergistic combination of the exterior jacket 22 and the tensile elements 16 allow for improved processing line speeds and buckling resistance, while maintaining or improving bend performance. As will be discussed more fully below, the exterior jacket 22 is made of polymer composition having a low coefficient of thermal expansion (CTE), which provides the antibuckling properties. In this way, the tensile elements 16 do not need to provide resistance to buckling, allowing the use of a more flexible material. Advantageously, the materials used for the tensile elements 16 are able to be wound around the buffer tube 14 at much faster rates than, e.g., strands of impregnated glass fibers. As such, the tensile element 16 has a longer laylength, which reduces the impact of the tensile element 16 on the bend performance of the drop cable 10.

Figure 2:
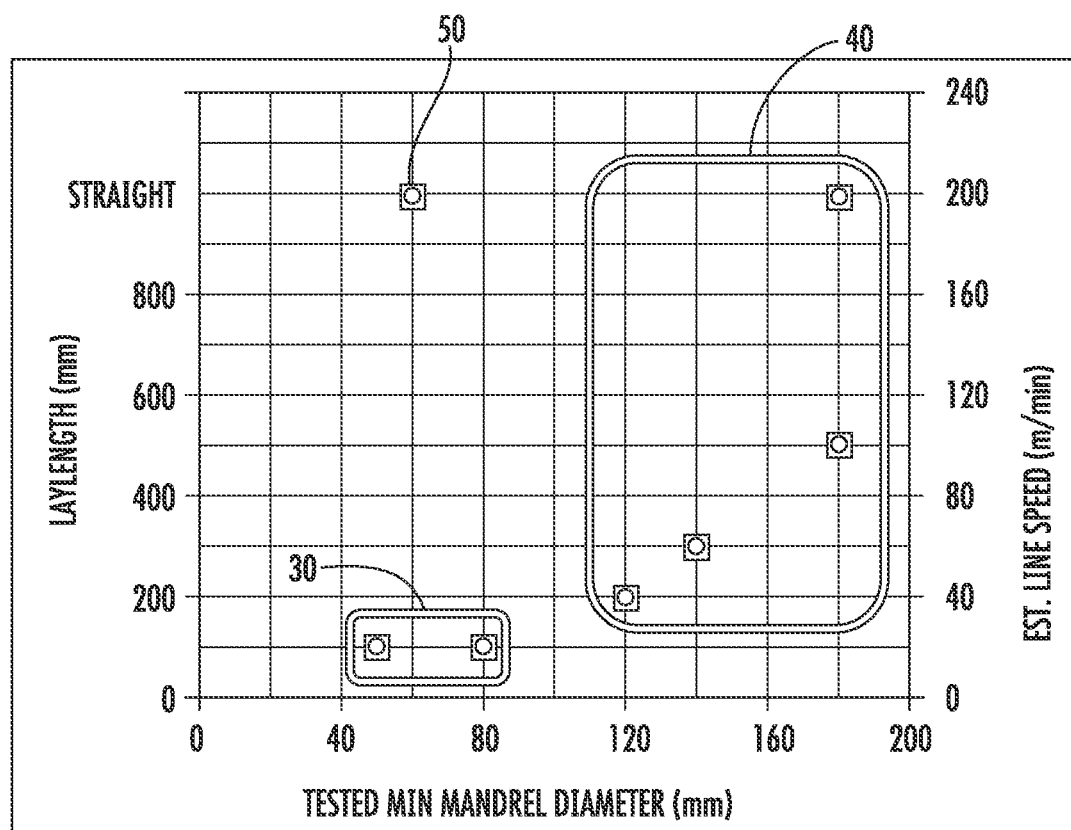
FIG. 2 is a chart relating the laylength, mandrel test diameter, and estimated line speed for producing a drop cable using various components for drop cable.

FIG. 2 provides a chart depicting the relationship between laylength, the estimated line speed (i.e., the rate at which the tensile elements 16 are applied to the buffer tube 14), and the minimum mandrel diameter to achieve a successful bend test. In general, strands of the tensile element 16 are wrapped around the buffer tube 14 in a helical fashion. Hence, the laylength of a strand refers to length of cable over which the strand completes one complete revolution of the cable circumference. Because the cable is continuously moving along the processing line as the strand is applied, the length of cable that passes before a complete revolution is made will depend on how fast the cable is moving. Thus, generally, the laylength and the line speed are directly proportional, and so, a large laylength corresponds to a faster cable processing line speed. In particular, the estimated line speed is equal to the product of the laylength and the rpm for winding the tensile elements 16 around the buffer tube 14. As indicated in the chart of FIG. 2, a laylength of 1 m or higher is considered "straight," i.e., the helical nature of the wrapping pattern is slight. Further, a shorter laylength corresponds to a slower processing line speed. However, the laylength may need to be within a certain range in order to provide desired bend performance. That is, a shorter laylength is generally associated with improved bend performance. However, that must be balanced against considerations of economical production, which generally dictates faster processing line speeds and longer laylengths.

For example, box 30 includes two cables having strands of glass fibers wound around the buffer tube. In order for such a cable to meet bend performance criteria, it has been determined that the strands of impregnated glass fibers must have a laylength of 100 mm. Additionally, the strands of glass fibers fall apart at winding rates of higher than 200 rpm. Taking these factors into consideration, the corresponding estimated line speed is 20 m/min (100 mm laylength*200 rpm). Box 40 includes four cables having strands of glass fibers wound around the buffer tube. As can be seen in box 40, the minimum mandrel diameter for achieving a successful bend test increases as the laylength and estimated processing line speed increase to 500 mm and 100 m/min, respectively.

By comparison, the tensile elements 16 of the disclosed drop cable 10 are more flexible than the strands of glass fiber, and therefore, longer laylengths do not affect bend performance. Indeed, point 50 corresponds to a drop cable 10 in which the tensile elements 16 of aramid fiber have a laylength of 1 m (i.e., "straight"), which corresponds to line speeds of 200 m/min. In order for cables using the strands of glass fiber as the tensile element to reach this processing line speed, the laylength has to be at least 500 mm, and the smallest mandrel to achieve a successful bend test is 180 mm (as can be seen in FIG. 2, box 40).

Utilizing the presently disclose cable construction with the strong and flexible tensile elements 16, the applicant believes that processing line speeds of up to 300 m/min or higher are possible. As mentioned, this is in part related to the ability to wind the tensile elements 16 in longer laylengths than the currently used strands of glass fibers. Thus, in embodiments, the tensile element 16 has a laylength of at least 200 mm. In other embodiments, the tensile element 16 has a laylength of at least 500 mm, and in still other embodiments, the tensile element 16 has a laylength of at least 1 m. In certain embodiments, the tensile element 16 has a maximum laylength of no more than 5 m, and in certain other embodiments, the tensile element 16 has a maximum laylength of no more than 2 m.

Turning the discussion now to the exterior jacket 22, the use of more flexible tensile elements 16 is the result of the antibuckling properties provided by the exterior jacket 22 of the drop cable 10. In particular, the exterior jacket 22 is designed to have a low CTE so as to limit the amount of cold temperature shrinkage and warm temperature expansion of the drop cable 10. The low CTE of the exterior jacket 22 is achieved by providing a composition that includes three classes of components: a polyolefin, a thermoplastic elastomers, and an inorganic filler. While the illustrated embodiments discuss the use of a low CTE composition for the exterior jacket 22, the interior jacket 18 can also be made of the low CTE composition.

Exemplary polyolefins suitable for use in the exterior jacket 22 include one or more of medium-density polyethylene (MDPE), high-density polyethylene (HDPE), low-density polyethylene (LDPE), linear low-density polyethylene (LLDPE), and/or polypropylene (PP), amongst others. Exemplary thermoplastic elastomers suitable for use in the exterior jacket 22 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others.

The inorganic fillers have high aspect ratio and are either rod-like or plate-like. A rod-like filler includes particles that, on average, are longer than they are thick. In a particular embodiment, the rod-like filler particles have, on average, a length to thickness ratio of at least 5:1. In an embodiment, the rod-like filler includes one or more of wood flour, glass fiber, halloysite, wollastonite, magnesium oxysulfate, and/or other reinforced fibers, amongst others. A plate-like filler includes particles that, on average, are both longer and wider than they are thick. In a particular embodiment, the plate-like filler particles have, on average a length to thickness and a width to thickness of at least 5:1. In an embodiment, the plate-like filler includes one or more of mica, talc, montmorillonite, kaolinite, bentonite, synthetic clay, and/or other clays, amongst others.

The composition of the exterior jacket 22 can further include dispersants and/or compatibilizers. Such additives aid filler dispersion, improve compatibilities between polymer matrices, and stabilize the phase morphology. Exemplary compatibilizers include block copolymers that have alternating olefin block and one or more other monomer blocks, i.e., alternating block of polyethylene and styrene containing segment (compatible with SEBS). Exemplary compatibilizers also include a grafted polymer having a polyolefin backbone that is grafted with a monomer that is compatible with the used thermoplastic elastomer. In an embodiment, carbon black is added to the composition, which absorbs ultra-violet light for outdoor applications.

In an embodiment, the thermoplastic elastomer component is present in the composition of the exterior jacket 22 in an amount of less than 60% by weight. In another embodiment, the thermoplastic elastomer component is present in the composition of exterior jacket 22 in an amount of no more than 50% by weight. In still another embodiment, the thermoplastic elastomer component is present in the composition of the exterior jacket 22 in an amount of no more than 40% by weight. Further, in embodiments, the thermoplastic elastomer component is present in the composition of the exterior jacket 22 in an amount of at least 30% by weight. In embodiments, the inorganic filler is present in the composition of the exterior jacket 22 in an amount of no more than 30% by weight. In another embodiment, the inorganic filler component is present in the composition of the exterior jacket 22 in an amount of no more than 20% by weight, and in still another embodiment, the inorganic filler component is present in an amount of no more than 10% by weight. Further, in embodiments, the inorganic filler component is present in the composition of the exterior jacket 22 in an amount of at least 5% by weight. The remainder of the composition of the exterior jacket 22 includes the polyolefin component, which, in embodiments, is present in an amount of from 30% to 60% by weight, and any other additives, such as dispersants, compatibilizers, carbon black, etc. In embodiments, these other additives are present in an amount of up to 5% by weight.

In embodiments, the mechanical properties of the composition of the exterior jacket 22 include a yield stress of at least 5 MPa at 23° C., a strain break of at least 400% at 23° C., and/or an elastic modulus of less than 2000 MPa when measured at −40° C. In other embodiments, the composition of the exterior jacket 22 has a yield stress of at least 10 MPa at 23° C., a strain break of at least 600% at 23° C., and/or an elastic modulus of less than 1800 MPa when measured at −40° C. Further, in embodiments, the thermal properties of the composition of the exterior jacket 22 include an averaged coefficient of thermal expansion (CTE) of no more than $120(10^{-6})$ m/mK and a thermal contraction stress of 6 MPa or less. In other embodiments, the composition of the exterior jacket 22 has an averaged CTE of no more than $100(10^{-6})$ m/m*K and/or a thermal contraction stress of 3 MPa or less. Additionally, in embodiments, the composition of the exterior jacket 22 has a melt temperature above 100° C. (i.e., at least one melt peak above 100° C. if the jacket compound has multiple melt peaks such that not all of the melt peaks must be above 100° C.).

Examples

Two exemplary polymer compositions for the exterior jacket 22 were made according to the embodiments disclosed. The first composition, Example #1, included 50% by weight of LLDPE, 40% by weight of SEBS (Kraton G1645M, available from Kraton Corporation, Houston, Tex.), 8% by weight of quaternary ammonium salt modified montmorillonite (Cloisite 15A, available from BYK Additives & Instruments, Wesel, Germany), and 2% by weight of polyethylene-grafted maleic anhydride (PE-g-MAH) used as a compatibilizer. The second composition, Example #2, included 49% by weight of MDPE, 39% by weight of SEBS, 10% by weight of quaternary ammonium salt modified montmorillonite, and 2% by weight of PE-g-MAH. Table 1 discloses the properties of these exemplary polymer compositions as compared to Comparative #1, which was 100% by weight MDPE.

TABLE 1

Properties Polymer Compositions for the Exterior Jacket of a Drop Cable

| Formulation | Elastic modulus at −40° C. (MPa) | CTE (*10$^{-6}$ m/m*K) | Contraction stress (MPa) | Elongation at Break (%) | Yield stress (MPa) |
|---|---|---|---|---|---|
| Example #1 | 1850 | 79.6 | 1.41 | >800 | 10.2 |
| Example #2 | 1760 | 108.2 | 2.86 | >800 | 7.8 |
| Comparative #1 | 1969 | 168.7 | 7.60 | >800 | 15.1 |

The CTE of the exemplary compositions and of the comparative example were measured using a thermomechanical analyzer (TMA). In particular, the averaged CTE was measured between −40° C. and 25° C. with the sample being heated at 2° C./minute. The elastic modulus at −40° C. was measured using a dynamic mechanical analyzer (DMA). As used herein, the thermal contraction stress refers to the stress generated by the sample when cooling from 35° C. to −40° C. The thermal contraction stress was measured on a DMA in iso-strain mode. In particular, the samples were clamped in the DMA and heated to 35° C. The clamp was locked at the initial length, and force was measured during cooling to −40° C. The samples were held at −40° C. for one hour to allow for sufficient stress relaxation. The stress after the one hour hold was reported as the thermal contraction stress. Finally, the elongation at break and the yield stress were measured according to ASTM D638.

As can be seen from Table 1, the exemplary compositions have lower elastic modulus at −40° C., a lower averaged CTE, and a lower thermal contraction stress. Thus, a drop cable 10 having an exterior jacket 22 made of one of these exemplary compositions will experience less buckling as a result of temperature fluctuations.

Figure 3:
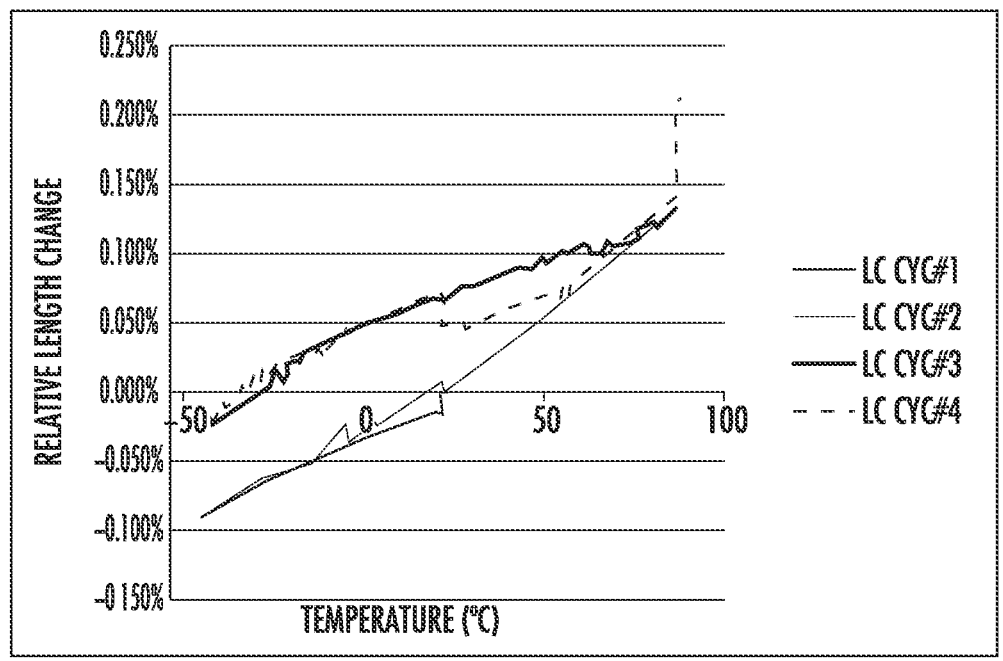
FIG. 3 is a graph of the cable length change during temperature cycling for glass-reinforced plastic rod coated with a conventional cable jacket.
Figure 4:
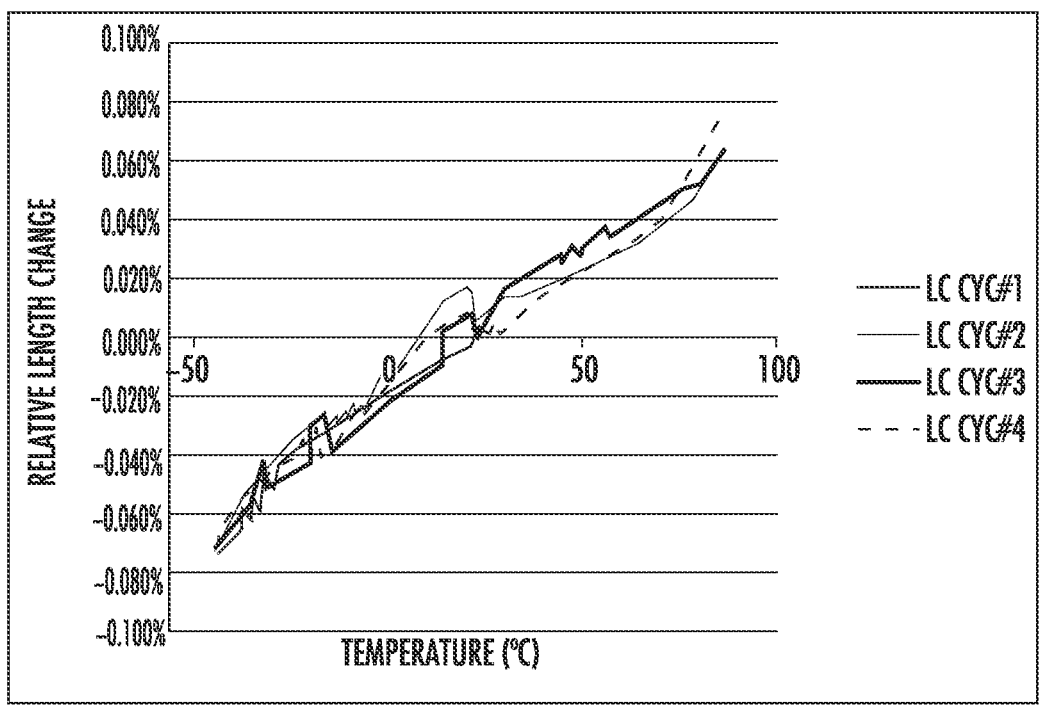
FIG. 4 is a graph of the cable length change during temperature cycling for glass-reinforced plastic rod coated with a composition in accordance with an exemplary embodiment.

Example #2 and Comparative #1 were each respectively coated onto separate 1.6 mm glass-reinforced plastic (GRP) rods. The diameter of each rod with exterior jacket was 2.7 mm. These rods were then subjected to temperature cycling from −40° C. to 80° C. for four cycles, and the relative length change (i.e., thermal strain) of the exterior jacket was measured. FIGS. 3 and 4 provide the relative length change during the course of each of the four cycles (LC CYC #1-LC CYC #4) for Comparative #1 and Example #2, respectively. As can be seen FIG. 3, Comparative #1 shrinks by 0.097%, whereas in FIG. 4, Example #2 shrinks by only 0.077%. Thus, Example #2 shrinks by 20% less than Comparative #1. Taking into account the typical thickness and diameter of an exterior jacket 22 of a drop cable 10, the applicant believes that a 40% reduction in length change is achievable.

As disclosed herein, the combination of the exterior jacket 22 and the tensile element 16 allows for improved processing line speeds without sacrificing antibuckling or bend performance. In particular, by shifting the antibuckling function to the exterior jacket 22, the tensile element 16 is able to be selected such that long laylengths and high processing line speeds do not adversely affect the final properties of the drop cable 10. As compared to a convention drop cable having a polyolefin jacket and strands of impregnated glass fibers wound around the buffer tube, the drop cable 10 as disclosed herein can be produced ten to fifteen times faster. The additional speed allows for the elimination of production lines, thereby saving operating and/or capital costs, or increased fiber output on the same number of production lines at a lower cost.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:
1. A method of manufacturing a drop cable, comprising the steps of:

moving a buffer tube containing at least one optical fiber along a processing line at a rate of at least 200 meters/minute;
winding at least one strand of a tensile element around the buffer tube, the tensile element having a laylength of at least 200 millimeters; and
coating the tensile element with an exterior jacket, the exterior jacket comprising a polyolefin component, a thermoplastic elastomer component, and an inorganic filler component.

2. The method of claim 1, further comprising the steps of:
wrapping the drop cable around a mandrel having a diameter of 60 mm three times;
sending an optical signal having a wavelength of 1550 nm through the a first end of the at least one optical fiber; and
losing less than 0.05 dB of the optical signal at a second end of the at least one optical fiber.

3. The method of claim 1, further comprising the step of selecting at least one of an aramid, a carbon fiber, an ultra-high molecular weight polyethylene, an ethylene chlorotrifluoroethylene, a polybenzimidazole, a perfluoroalkoxy, a polytetrafluoroethylene, a polyphenylene sulfide, a liquid crystal polymer, or a polyphenylene benzobisoxazole for use as filaments in the at least one strand of the tensile element.

4. The method of claim 1, further comprising the step of extruding a layer of a flame retardant, non-corrosive material around the at least one strand of a tensile element.

5. The method of claim 4, further comprising the step of wrapping at least one strand of impregnated glass fibers around the layer of the flame retardant, non-corrosive material.

6. The method of claim 1, further comprising the step of selecting the exterior jacket to comprise a composition of from 30% to 60% by weight of the thermoplastic elastomer component, from 5% to 30% by weight of the inorganic filler component, and with the remainder being the polyolefin component and/or other additives.

\* \* \* \* \*

UNITED STATES PATENT AND TRADEMARK OFFICE
CERTIFICATE OF CORRECTION

PATENT NO. : 11,366,276 B2
APPLICATION NO. : 17/186430
DATED : June 21, 2022
INVENTOR(S) : Xiaole Cheng et al.

It is certified that error appears in the above-identified patent and that said Letters Patent is hereby corrected as shown below:

In the Claims

In Column 9, Line 15, in Claim 2, delete "the a" and insert -- the --.

Signed and Sealed this
Twentieth Day of September, 2022

Katherine Kelly Vidal
*Director of the United States Patent and Trademark Office*